United States Patent
Thomas et al.

(10) Patent No.: US 7,468,778 B2
(45) Date of Patent: Dec. 23, 2008

(54) VIRTUAL STUDIO SYSTEM

(76) Inventors: Graham Alexander Thomas, Anderida, Ridge Close, Nutley, Uckfield, East Sussex TN22 3HA (GB); Oliver Grau, 7 Parr Close, Leatherhead, Surrey KT22 7HD (GB)

( * ) Notice: Subject to any disclaimer, the term of this patent is extended or adjusted under 35 U.S.C. 154(b) by 163 days.

(21) Appl. No.: 10/941,068

(22) Filed: Sep. 15, 2004

(65) Prior Publication Data

US 2005/0099603 A1 May 12, 2005

Related U.S. Application Data (63) Continuation-in-part of application No. PCT/GB03/01094, filed on Mar. 14, 2003.

(30) Foreign Application Priority Data

Mar. 15, 2002 (GB) .................................. 0206214.9

(51) Int. Cl.
*G03B 19/18* (2006.01)
*G03B 21/32* (2006.01)
*G03B 15/00* (2006.01)

(52) U.S. Cl. ................ 352/85; 352/44; 396/3

(58) Field of Classification Search ............... 352/42, 352/44, 45, 47, 48, 59, 85, 88, 89, 133; 353/28, 353/122; 396/3, 4
See application file for complete search history.

(56) References Cited

U.S. PATENT DOCUMENTS

| | | | |
|---|---|---|---|
| 5,353,074 A | | 10/1994 | Jones et al. |
| 5,790,124 A | * | 8/1998 | Fischer et al. ............... 345/629 |
| 6,359,664 B1 | * | 3/2002 | Faris ............................ 349/15 |
| 6,361,173 B1 | * | 3/2002 | Vlahos et al. ................. 353/97 |
| 6,454,415 B1 | * | 9/2002 | Vlahos ........................ 353/30 |
| 6,535,241 B1 | * | 3/2003 | McDowall et al. ............ 348/51 |
| 6,616,281 B1 | * | 9/2003 | Vlahos et al. ................. 353/28 |

FOREIGN PATENT DOCUMENTS

EP  0 993 204 A1  4/2000

(Continued)

OTHER PUBLICATIONS

Raskar R et al., "Spatially Augmented Reality", First International Workshop on Augmented Reality, San Francisco, CA, USA, Nov. 1, 1998, pp. 63-72, XP008018391 1999, Natick, MA, USA, A. K. Peters, USA ISBN: 1-56881-098-9.

*Primary Examiner*—Rodney E Fuller
(74) *Attorney, Agent, or Firm*—Venable LLP; Robert Kinberg; Jeffri A. Kaminski (57) ABSTRACT

A method of providing a visual representation of a scene to a participant in a studio is provided, wherein the studio is arranged to be viewed by a camera to provide a camera image and has at least a portion of a background object arranged to be keyed out of the camera image by a keying process. The method includes obtaining an estimate of the viewpoint of the participant; rendering an image of the scene based on the viewpoint of the participant; and projecting at least a portion of the rendered image onto the background object to provide a projected image portion visible to the participant. The projected image portion is projected so as to be keyed out of the camera image by the keying process.

22 Claims, 2 Drawing Sheets

FOREIGN PATENT DOCUMENTS

| | | |
|---|---|---|
| EP | 1 081 955 A2 | 3/2001 |
| FR | 2 714 741 A1 | 7/1995 |
| GB | 2 321 814 A | 8/1998 |
| GB | 2 323 733 A | 9/1998 |
| GB | 2 352 899 A | 2/2001 |
| JP | 9311383 A | 12/1997 |
| JP | 2002 042158 A | 2/2002 |
| WO | WO 97/28654 A2 | 8/1997 |
| WO | WO 98/43414 A1 | 10/1998 |
| WO | WO 00/72264 A1 | 11/2000 |
| WO | WO 02/067050 A1 | 8/2002 |

* cited by examiner

FIG. 3

VIRTUAL STUDIO SYSTEM

CROSS-REFERENCE TO RELATED APPLICATIONS

This application is a continuation-in-part of International Application No. PCT/GB03/01094 filed Mar. 14, 2003, designating the United States and claiming priority from British Application GB 0206214.9, filed Mar. 15, 2002. All of the foregoing applications, together with each U.S. and foreign patent and patent application mentioned herein, are incorporated herein by reference.

BACKGROUND OF THE INVENTION

The present invention relates to virtual studio systems, particularly but not exclusively chroma-keying studio systems.

Chroma-keying is a technique that allows synthetic images to be created by determining if a pixel in a camera image belongs to foreground or background based on colour. The foreground pixels can then be keyed into a second image, e.g. a computer-generated or static background as in virtual studios. The background in the studio must have the particular keying colour, typically blue. This is usually achieved by painting the studio floor and visible walls with the keying colour. Another option is to use a retro-reflective cloth and an active illumination ring around the camera lens as proposed in our earlier GB-A-2,321,814 the entire disclosure of which is incorporated herein by reference.

Although Chroma-keying is a preferred application, the present invention is also applicable to other keying techniques (for example using temporally modulated lighting of the background to distinguish foreground and background).

In this specification, the term "participant" is intended to encompass without limitation any actor or presenter (human or animal) or indeed any form of animate entity which might benefit from a view of a virtual scene.

One problem for a participant in a virtual studio is to interact with the objects in the virtual set that are not visible for him or her. In particular, if the participant has to interact with a virtual object, e.g. a virtual character, then there is often a difference between the direction in which the participant looks, and the position of the virtual character that he should be looking at (the so-called eye-line problem). This can be quite disturbing in the final programme.

An approach to providing the participant with a visual cue of objects in the virtual set is described in U.S. Pat. No. 5,886,747. This discloses projecting an outline of basic objects onto the floor and walls and further describes how to make these marks invisible to a studio camera by projecting only during the blanking interval of the camera. However, the method described is restricted to showing the main points of intersection of the important virtual objects with the particular floor or wall so, for example, a virtual actor in the scene would only be visualised as footprints. It is disclosed that the system can typically draw 100 dots per frame which is considered sufficient to outline large static objects or to animate small objects. Indeed, the solution can effectively be considered an electronic alternative to the previous measure of physically placing masking tape on the floor and walls at important object boundaries (as discussed in column 1, lines 53 to 57 of the document).

This prior art visual cue system for virtual studios does not however deal directly with the eye-line problem, i.e. the case that a participant has to look towards a portion of a virtual object that is in space (for example the face of a virtual actor) but merely gives the participant an idea of the position of objects in the studio.

By way of general background, outside the field of virtual studio production, systems are known that can provide functionality to enable a user to see objects in a virtual environment, but these are generally neither intended nor suited to the constraints of a virtual studio environment. One example is projection-based VR (virtual reality) systems like the CAVE: Cruz-Neira, C., Sandin, D. J., DeFanti, T. A., Kenyon, R. V., and Hart, J. C. "The CAVE: Audio Visual Experience Automatic Virtual Environment," Communications of the ACM, Vol. 35, No. 6, June 1992, pp. 65-72. This system tracks the position of the viewer's head and computes an image for that particular view-point of the viewer, which is then projected onto a large screen forming one wall of the environment. Several screens are usually used to provide a wide field-of-view, and some installations provide an all-round view using six projection screens that completely surround the viewer. Therefore it is possible to present objects that appear virtual in space. The head position of the viewer is usually tracked using a special device, e.g. a helmet with an electromagnetic transmitter. Such a system is of course not designed for nor suited to a virtual studio environment for a number of reasons. The head-tracking device would be visible in any final programme and, more fundamentally, virtual studios which may have a combination of "real" objects at arbitrary positions and require a background of a key colour do not provide the open space with large screens on which images can be projected at will as this system requires.

SUMMARY OF THE INVENTION

The present invention is specifically concerned with a system which is suited for use in a virtual studio i.e. having a background which must be keyed out of a camera image.

According to a first aspect, the invention provides a method of providing a visual representation of a scene to a participant in a studio, the studio being arranged to be viewed by a camera to provide a camera image and having at least a portion of background object arranged to be keyed out of the camera image by a keying process, the method comprising: obtaining an estimate of the viewpoint of the participant; rendering an image of the scene based on the viewpoint of the participant; and projecting at least a portion of the rendered image onto the background object to provide a projected image portion visible to the participant, wherein the projected image portion is projected so as to be keyed out of the camera image by the keying process.

Thus, by rendering an image based on the participant viewpoint, the eye-line problem present with the static outline method of the prior art can be alleviated. However, the image is projected so as to be keyed out by the keying process. As will become apparent, there are a number of ways in which this can be achieved. The estimate of the viewpoint of the participant will typically be based on a measure of position of the participant.

The background object may comprise a static object, typically the studio background. Additionally or alternatively, the background object may comprise an object in the studio, optionally a movable object, which is to be replaced with a virtual object. For example, a card, picture or block may have a graphic superimposed on it during a production. This may be done in addition to or instead of replacing the background and/or other objects with virtual objects. In the case of the background object being static, it is desirable to store data concerning the geometry of the object. In the case of a movable background object, it is desirable to receive an input of a measure of the background object position. Such a measure of position may be obtained by using a camera to detect position, advantageously using a method as disclosed in our GB-A-2,325,807, the entire disclosure of which is incorporated by reference. A movable background object may have an active tracking device integrated therein. The active tracking device may be conventional for example a radio or ultrasound transmitter or receiver which in combination with one or more external complementary receivers or transmitters in the studio enable the position to be determined using one of a number of conventional techniques. Such an object may be independently provided in a further aspect of the invention which provides an object having an at least partially retro-reflective surface for reflecting key light to a camera to enable the object to be keyed out of the camera image, the at least partially retro-reflective surface also serving to render visible a projected image, the object having integrated therein means for co-operating with position determining apparatus for determining the position of the object in a studio. The means for co-operating may comprise a collection of identified markers, such as circular bar codes as described in our GB-A-2,325,807, the position determining apparatus comprising a camera and processing apparatus as described in that document. Alternatively, the means for co-operating may comprise an active tracking device, for example including at least one transmitter or receiver.

The image is preferably projected from at least one direction different from the direction of view of the camera; this may enable a participant facing away from the camera to see background detail which would not be visible to the camera and, particularly with a retro-reflective background, this reduces the amount of the projected image reaching the camera.

Preferably the keying process is a chroma-keying process and the image is projected so that the colour of the background portion as seen by the camera is substantially a background colour. Thus the keying process is not affected by the image. Surprisingly, we have found that it is possible to project a complex rendered image onto a background that is designed to be chroma-keyed out of an image without disrupting the keying process.

In some implementations, this may be achieved by selection of projected image intensity and keying thresholds with a conventional background. However, much more preferably a retro-reflective background is used; this may enable effective keying and good visibility of the projected image over a wider range of intensities.

Preferably the background retro-reflects a portion of light with a first, relatively high, reflectivity and diffusely reflects light with a second, relatively low, reflectivity. This is an important preferred feature, as it enables a good clean key colour to be obtained by retro-reflection of the key light with any scattered light from the projected image being of significantly lower intensity.

The background may be lit with key light from a direction substantially coincident with the camera direction so that key light is retro-reflected to the camera with a first, relatively high, intensity and the projected image is projected from a different direction. The direction is preferably chosen so that the projected image is not retro-reflected to the camera over a range of expected camera movement. The position will depend on the properties of the background; typically the background may "retro-reflect" a substantial portion of light up to a few degrees off the axis of incidence, with the reflectivity falling sharply at greater angles and becoming diffuse reflection (suitable cloth and typical properties are discussed in our GB-B-2,321,814, and GB-B-2,321,565 incorporated herein by reference—preferred features of the background discussed in those patents may be used as preferred features of the background in this application).

The image is preferably projected so as to be visible to the participant based on diffuse reflection. The intensity required can simply be judged literally by eye based on ambient studio lighting conditions.

Preferably the first reflectivity is at least double the second reflectivity, preferably at least ten times the first reflectivity. In practice, with the retro-reflective material described in our earlier patents, a ratio of well over ten to one, typically easily over twenty to one, is easily achieved.

The key light may comprise light of a selected key colour, in a chroma-keying method. Alternatively or additionally the key light may comprise light having a selected temporal variation.

In a preferred arrangement, particularly for front projection, the method may further comprise masking a portion of the projected image based on the position of the participant to reduce projection onto the participant.

This method may be provided independently in a second aspect which provides a method of projecting an image onto a background in a space in which a participant is positioned, the method comprising rendering an image based on the position of the participant, the method further comprising masking a portion of the projected image based on the position of the participant to reduce projection onto the participant.

In addition to or as an alternative to masking a portion corresponding to the participant, the method may comprise masking a portion of the projected image based on the position of an object to reduce projection onto the object.

In a third aspect, the invention provides a method of projecting an image onto a background in a space in which an object is positioned, the method comprising dynamically rendering the image, the method further comprising dynamically masking a portion of the projected image based on the position of the object to reduce projection onto the object.

Preferably the masked portion is based on a stored or estimated outline of the participant or other object. This may facilitate masking. Additionally or alternatively, the mask may be based on one or more camera images of the participant or object.

Preferably a mask signal is generated to mask a portion of the image; this facilitates processing. Alternatively or additionally, the rendering process may take into account any required masking so that rendering is not performed, or a reduced level of rendering is performed in regions to be masked.

Preferably the outline is larger than the actual outline of the participant; this reduces the risk of stray projection onto the participant (or object). The outline may be enlarged along an axis of motion of the participant.

In an alternative embodiment, the background retro-reflects a portion of light and the background is at least partially translucent. This permits back-projection of images in addition to or as an alternative to front projection.

In a preferred arrangement the background is lit with key light from a direction substantially coincident with the camera direction so that key light is retro-reflected to the camera with a first, relatively high, intensity and the projected image is projected onto the rear of the background. Back-projection will typically result in a lower intensity of transmitted light reaching the camera than the light retro-reflected under normal circumstances, but the intensities of each light may be managed if high intensity projection is used.

A masking process similar to that used in the case of front projection may be used for back projection to reduce stray light entering the camera. In this case, the primary problem is that of light passing directly through the background, rather than reflecting off objects or participants, so the primary information to take into account is the camera and projector positions. The projector position will typically be fixed and can be stored but the camera position (or field of view) may change so that is preferably provided as an input. Thus the projected image may be at least partially masked or attenuated based on the position of a camera viewing the background to reduce the intensity of light from the projected image reaching the camera.

It will be apparent that both in the case of front and back projection, masking may advantageously be used to reduce stray light and the underlying principle may be applied independently. In a further aspect, the invention provides a method of projecting an image onto a background viewed by a camera, the method comprising masking or attenuating at least one portion of the projected image based on at least one of the position of a participant or other object and the position of the camera to reduce stray light from the projected image reaching the camera.

In all cases, the projection intensity, the key light intensity and the background properties are selected so that the intensity of the key light received at the camera is at least double, preferably at least ten times, the intensity of light received from the projected image. With the background and key light projection arrangement described in our earlier patents this should be routinely achievable using conventional or high intensity video projectors located even a few degrees offset from the camera view direction. As will become apparent below, practical arrangements will normally have a larger offset and will in practice normally be typically at least 5 degrees, preferably at least 15 degrees, in practice of the order of at least 30 to 60 degrees or greater.

In all cases, preferably the intensity of the projected image is selected so as to be visible by the participant but so that the scattered light from the projected image does not substantially disrupt the keying process.

As an additional or alternative measure, the image may be projected during a period when the camera shutter is closed. The keying process may be based on temporal modulation of the background illumination and the projected image may be temporally modulated.

The participant's viewpoint is preferably estimated based on the measure of position of the participant. The measure of position advantageously comprises an estimate of position of a body portion of a participant and wherein the viewpoint is estimated based on a physical relationship of the body portion to the eyes of the participant. Most preferably the position of the head of the participant is estimated. The methods disclosed in our GB-A-2,352,899, incorporated herein by reference, may be used as preferred methods of estimating position. An estimate of the position of the head of the participant may be used as an estimate of the viewpoint of the participant; this simplifies the process while remaining sufficiently accurate for most purposes. The method may include filtering the estimate of viewpoint to avoid sudden changes or to reject estimates which display unexpected motion or unexpected positions (for example a sudden increase in height or a height greater than the height of the participant). This may be advantageous particularly when viewpoint is estimated based on a camera image as such a method may produce occasional spurious results if, for example, an actor's arm moves above or past his head.

The participant position may be determined based on an image from at least one position information camera. The at least one position information camera comprises at least one auxiliary camera. Additionally or alternatively the (studio) camera providing the studio camera image may also serve as a (main or supplementary) position information camera.

Preferably the image is projected from a plurality of sources, preferably at at least two distinct locations. This may reduce masking of portions of the background by the participant or by objects in the set. Images from at least two sources at least partially overlap. The intensity of at least one image may be modulated or (additionally or alternatively) a portion of at least one image may be masked to reduce intensity variation in a region of overlap.

In a further aspect the invention provides a method comprising rendering an image for projection onto a virtual studio background, the studio having a participant therein, the method comprising rendering the image from a viewpoint based on positional information concerning the participant, the method further comprising masking a portion of the image based on the position of the participant.

In all cases, rendering preferably includes receiving information concerning the position of at least one image projector. Rendering may include receiving information concerning the studio geometry and/or adjusting the image based on background geometry. Information concerning at least one of:—projector location, studio geometry, background geometry, objects within the studio, participant dimensions and camera position is preferably stored.

In the case of two or more participants, a single image may be provided for the participant who needs clues most or two (or more) images may be provided. In a preferred development, the method further comprises projecting at least two images to be separately viewable by two participants. The images may be projected onto separate background object portions. However, more commonly the images may at least partially overlap. Preferably the images are multiplexed and the participants are provided with demultiplexing means so that each participant views preferentially a single image.

This may be provided independently in a further aspect which provides a method of providing images for at least two viewers, the method comprising projecting a first image for a first viewer and a second image for a second viewer, the images at least partially overlapping and being multiplexed in at least a region of overlap and providing each viewer with respective demultiplexing means to provide each viewer with a preferential view of one image.

Methods of multiplexing two images are known and have been used in the past to provide 3D or stereoscopic effects. For example, overlaid separately polarised images, red and green images, temporally multiplexed images have been used. Any of these methods may be used to achieve multiplexing for the two viewers. In contrast to the prior art which multiplexed images for a single viewer, the inventor has appreciated that separate (2D) images can be provided for separate viewers, using similar techniques; hitherto it has not been appreciated that such techniques could be extended in this way.

The images may be colour multiplexed and each viewer or participant may be provided with demultiplexing means comprising a respective colour filter, preferably in the form of a coloured contact lens.

The images may be polarisation multiplexed and each viewer or participant may be provided with demultiplexing means comprising a polarising filter, preferably in the form of polarising glasses or a polarised contact lens. Contact lenses used to combat astigmatism, having an asymmetric weight are known and such can be provided with a polarising filter. The invention further independently provides a contact lens having an asymmetric weight distribution and a polarising filter.

The invention further provides use of a selectively transparent, preferably coloured and/or polarised, contact lens to demultiplex a multiplexed image, preferably for one of a plurality of viewers. The invention further provides a kit for optical demultiplexing of at least two multiplexed images by at least two viewers comprising a first optical apparatus (preferably a pair of (or at least one) spectacles or contact lenses) wearable by a first viewer and having a first selective optical transmission property and a second optical apparatus (preferably a pair of (or at least one) spectacles or contact lenses) wearable by a second viewer and having a second selective optical transmission property, as well as further providing use of such a kit or portion thereof to obtain at least one image from a multiplexed image.

The images may be temporally multiplexed and each viewer or participant may be provided with demultiplexing means comprising an optical filter having a temporally varying light transmission. The temporally varying light transmission is preferably synchronised to the projectors and preferably also synchronised to the shutter of a camera viewing the scene—this may enable the filters (typically in the form of glasses) to be viewed by the camera at a time when they are transparent (or opaque) as desired.

The aforementioned methods preferably further comprise recording a sequence of images of the participant with a studio camera. Implementations of the method will typically further comprise processing said sequence of images to remove or replace the background by the keying process, wherein the projected image is substantially removed.

Another aspect of the invention provides independently a computer program or computer program product or apparatus arranged for performing any methods or sub features of methods. Preferred and optional features of the method aspects may be applied to all other aspects and vice versa.

Another aspect of the invention further provides a projected image produced by any method.

Another aspect of the invention further provides a virtual studio production produced by any method.

Another aspect of the invention further provides a mask signal generated in a rendering method.

Another aspect of the invention provides image rendering apparatus, preferably for use in an above mentioned method, the apparatus comprising: means for receiving a measure of a participant position; means for storing a measure of a participant outline; means for rendering an image based on the participant position, the rendered image having at least a portion masked based on the participant outline.

The apparatus may include means for storing a measure of at least one projector position and/or means for storing a measure of studio geometry and/or means for determining the stored measure of participant outline based on at least one of: a dynamic image of the participant; stored information on the participant outline; and information on movement or expected movement of the participant.

Another aspect of the invention provides a production studio arranged for use in any method, the studio including a background and means for projecting a dynamically rendered image onto the background so as to be keyed out of the image of a studio camera by a keyer.

Another aspect of the invention provides a production studio comprising: an at least partially retro-reflective background; means for determining a measure of position of a participant in the studio; means for rendering an image based on participant viewpoint; means for projecting the rendered image onto the background so as to be visible to the participant.

The means for projecting may comprise at least one projector for projecting onto the front of the background. The means for rendering may be arranged to mask a portion of the projected image corresponding to participant position.

The production studio may further comprise at least one camera having means for illuminating the background with a key light and/or may further comprise a keyer for keying out the background image from a camera image of the studio.

A head-tracking system based only on visual information is preferred, so that the viewer need not wear any extra device. This can be achieved using the image from the main studio camera and ideally some auxiliary cameras. Since there is preferably a chromakey background available, the outline of the actor may advantageously be obtained in a robust way to facilitate head-tracking. The position of the actor's head may then be used to control the rendering of the scene, to give the actor the correct perspective of the virtual scene. This may allow a precise orientation of the gaze towards objects that are virtually present in the studio.

Furthermore the projection system may be combined with a robust chroma-keying system in such a way as to make the projected image clearly visible to the performer without interfering with the chroma-key process. Whilst this can be achieved to some extent by using conventional blue screens with low-level projection, a more effective method is provided by the use of retro-reflective screen material and coloured (blue) light sources on each camera as described.

It is noted that a further aspect of the invention is concerned with the projection method itself and is not limited to a virtual studio environment, but is suited thereto. In a typical non-studio environment, rear projection is used which requires a lot of space behind the screens and presents particular problems with the floor. It is often more convenient to use front projection, but this presents the problem of the projected image falling on the actor, and the actor casting shadows on the screen. However, the shadows cast on the screen are not a major problem in application with which the present invention is concerned, as the projected images are used for providing visual cues rather than a fully-realistic virtual environment where they may be problematic—as noted elsewhere, the requirements of virtual studio production and a virtual environment simulation are quite distinct. Conversely, the appearance of projected images on the actor will be visible in the final programme (whereas they would not be so problematic in a generalised virtual environment). One aspect of the invention therefore includes a method to prevent the appearance of projected images on the actor by blanking the appropriate part of each projected image, preferably using information describing the actor's position and shape (although this may be simplified to a basic outline or even a rectangle).

It will be appreciated that, although the invention is described in a virtual studio context, features and combinations of features may be used elsewhere and may be provided independently, unless otherwise stated.

BRIEF DESCRIPTION OF THE DRAWINGS

An embodiment of the invention will now be described with reference to the accompanying drawings.

DETAILED DESCRIPTION OF THE INVENTION

Figure 1:
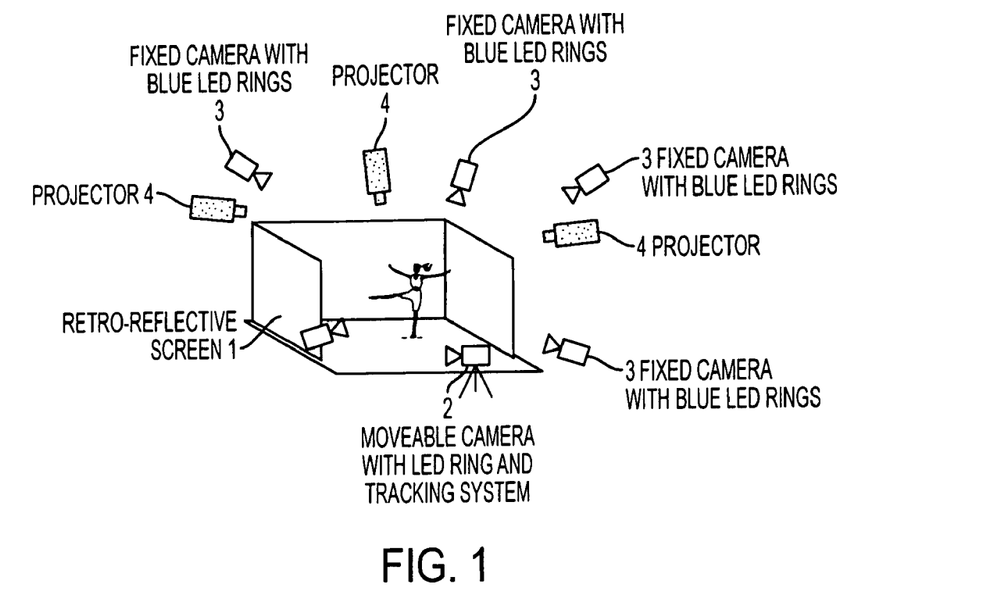
FIG. 1 shows the arrangement of cameras, projectors and screens in the studio.
Figure 3:
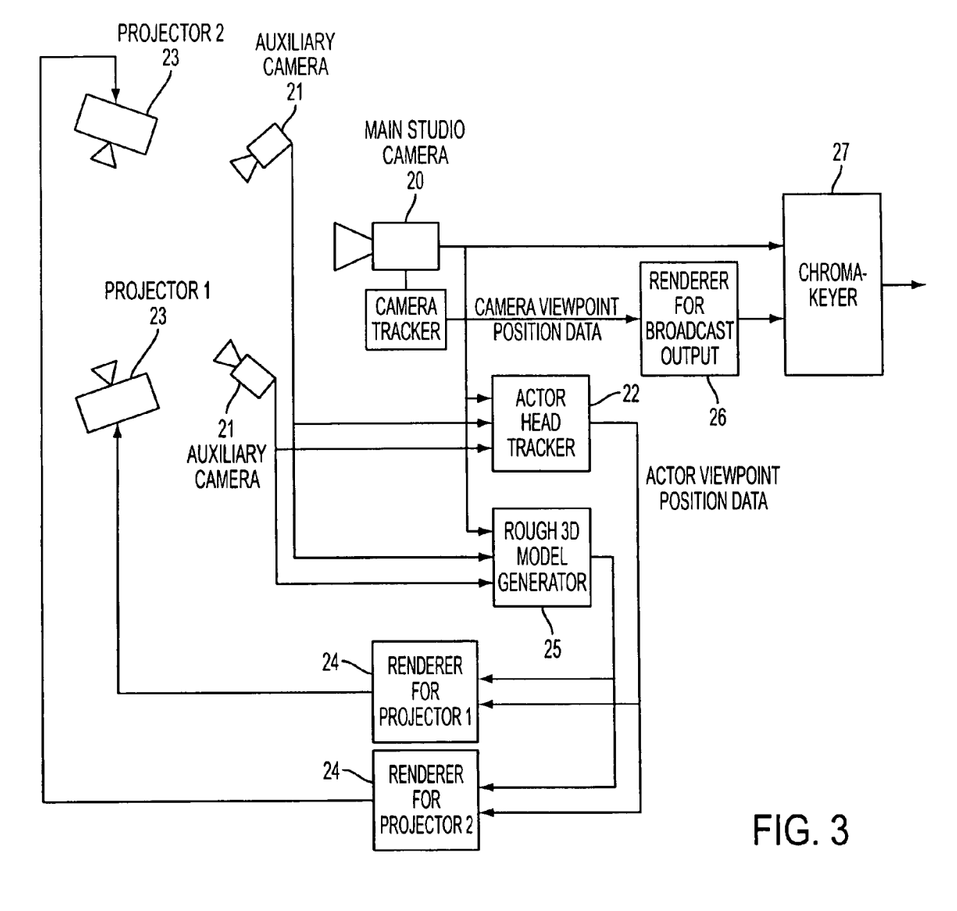
FIG. 3 shows a block diagram of the main elements of a system incorporating the invention.

The walls of the studio area 1 are composed of a retro-reflective cyclorama cloth, as described in GB-B-2,321,814, and GB-B-2,321,565 to which specific reference should be made for details of suitable cloth and camera arrangements as required and the entire contents of each of which are herein incorporated by reference. One or more studio TV cameras 2, 20 view the scene. As described in the above mentioned patents, each of these is preferably fitted with a coloured light source, so that the reflective cyclorama appears brightly-lit with this colour from the viewpoint of the camera, but still appears as a neutral (typically grey) colour from other viewpoints. The cloth has the property that it is retro-reflective (that is it reflects a significant portion of light back to the direction of a light source) and has a generally grey appearance otherwise. Each studio TV camera may also be fitted with a camera tracking system to allow camera movement to be monitored. An example of a suitable tracking system may be found in GB-A-2,325,807, the entire disclosure of which is incorporated herein by reference, but other tracking systems may be used. The video signal from the studio camera, and any tracking data, are passed to a renderer 26 that generates background images at broadcast TV standard. The camera image is keyed over these images using a chroma-keyer 27. These rendering and keying processes may also incorporate other conventional virtual studio practices such as generating mask signals to allow virtual objects to appear in front of performers.

One or more auxiliary cameras 3, 21 also view the scene. The images from these cameras, and optionally from the main camera 2, 20 are analysed to track the position of the actor's head by a head tracker 22. This tracking can be carried out using one of several known tracking methods. A preferred example of an actor tracking method is described in GB-A-2,352,899, the entire disclosure of which is incorporated herein by reference. The availability of the silhouette image from the actor by using chroma-keying can be used to simplify or enhance the tracking process. The tracking method should ideally estimate the approximate position of the midpoint between the actor's eyes. This may be approximated in practice by determining a measure of the position of a part of the actor, preferably the head or a portion thereof and determining a measure of the position of the eyes based on the position of the part and a positional relationship (either predetermined or based on supplemental information). For example, the position of the top of the head may be determined and an estimate of the eye position obtained based on stored data correlating the eye position to the head either for a range of actors or a specific actor. High accuracy is not normally critical, but can be obtained if required using available conventional positioning aids or image analysis. For example an estimate that the midpoint of the eyes is 10 cm below the top of the head and centrally positioned will normally suffice for most practical purposes.

One or more projectors 4, 23 are mounted so as to project images onto the cyclorama walls. The projectors project onto the walls from the front, although rear projection may also be used if space permits. Each projector is fed from a 3D renderer 24, consisting for example of software running on a personal computer equipped with a 3D graphics accelerator. Each renderer calculates a view of the virtual scene with viewing geometry to match the measured head position of the actor and the geometrical arrangement of the projector and screen. Images should be computed at a sufficient rate to give the actors an acceptable rendition of the scene, ideally at least 10 frames per second, and preferably 50 Hz or more. The implementation of such rendering software is well-known to one skilled in the art, and may be based on conventional software systems such OpenGL, Open Inventor or IRIS Performer.

Preferably, the rendering of the image also takes account of the keystone distortion caused by the projector not projecting at right-angles onto the projection screen. The constraints imposed by the physical studio arrangement will usually make the correction of such distortion impossible by using only the keystone distortion correction provided by the projector itself. Furthermore, the image from one projector may fall on two or more non-coplanar surfaces, such as two walls or one wall and the floor. In this case, the rendering software may be adapted to render different parts of the image using different viewing geometries so as to present the actor with a correctly-rendered image on all surfaces. In the case of a moving background object the rendering process may take into account movement of the background object, for example as detected by tracking cameras or an active tracking system.

In order to prevent the projected images from falling on the actor, and thereby being visible by the main studio camera 2, a mask is calculated for each projector to mask out the light that would otherwise fall on the actor.

One way in which such a mask signal can be generated is by computing a rough 3D model of the actor using the video signal from the auxiliary cameras 3, 21, by a processing unit 25. A technique such as shape-from-silhouette, as described in "W. Niem. Robust and fast modelling of 3d natural objects from multiple views. In SPIE Proceedings, Image and Video Processing II, volume 2182, pages 88-397, San Jose, February 1994" is suitable for this application. The actor model is passed to each projector's 3d renderer and rendered as a black object to appear in the scene at a position so as to be projected onto the real actor.

In a similar way, other "real" objects in the studio (e.g. props such as tables, chairs) can be masked out to prevent projected light being reflected from the objects into the camera.

Figure 2:
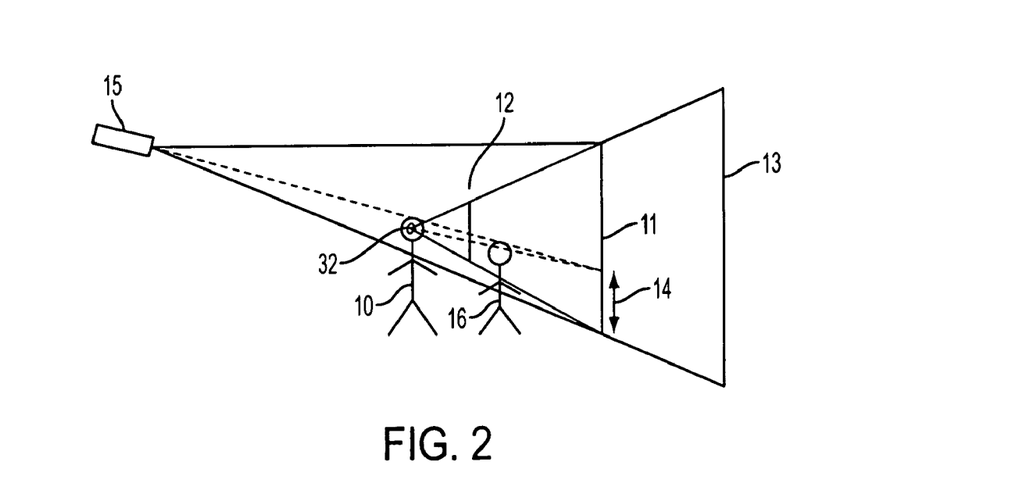
FIG. 2 shows how a rough model of the actor is incorporated in the scene to provide a mask.

Although at first sight it might appear sufficient to simply insert the actor model into the virtual scene at a position and scale matching the real actor, it has been appreciated that this will generally not have the desired effect, since the projected scene will have been rendered from the viewpoint of the actor, and from this viewpoint the actor himself is not visible. Thus it is preferred to translate and scale the actor model so that it appears at a location in the viewing frustum of the renderer that will obscure the real actor, taking into account the position of the projector. This is illustrated in FIG. 2. The actor 10 views the screen 11, and the viewing volume of the virtual scene which needs to be rendered is the frustum lying between the near clipping plane 12 and the far clipping plane 13. The portion 14 of the projected image which will be projected onto the actor by the projector 15 must be masked out by placing a black object at the appropriate point in the scene. Such a mask object cannot be obtained by placing the rough 3D model of the actor in the scene exactly coincident with the real actor 10, since the real actor lies outside the viewing frustum. Instead the actor model is moved just inside the viewing frustum to position 16, and scaled such that the image of the actor model as viewed from the position of the real actor matches the part of the projected image that the actor's shadow would fall upon. The translation and scaling that must be applied to the actor model may be calculated using conventional geometrical methods, given knowledge of the position of the screen and the projector, and the viewpoint of the actor. It is advantageous to place the actor model just inside the viewing frustum, since it should appear to be the frontmost object in the scene; any scene elements between the near clipping plane and the actor model will not be blanked.

An alternative method of blanking the appropriate portion of the projected image is to perform a separate rendering process, which renders the view of the actor model (positioned at the actual location of the actor) from the position of the projector 15, to obtain a mask signal. Such a mask signal might show the actor as a black object against an otherwise white background. This mask signal can then be used to mask out the portion of the screen on which the actor's shadow would fall, for example by placing the mask image in the OpenGL Stencil buffer. The same effect could also be achieved by first rendering the scene with a viewing frustum appropriate for the actor, and then changing the viewing frustum to correspond to the viewpoint of the projector, and rending a scene containing just the actor model, but with the OpenGL 'depth test' control disabled. This guarantees that the actor model will be rendered on top of the previously-rendered image, thereby blanking the appropriate portion.

A third method of masking out the actor is to generate the actor mask signal by placing an additional auxiliary camera close to the projector 15. The camera should be fitted with a chromakey light source if a retro-reflective screen is being used. A chromakeyer can then be used to obtain a key signal. It will generally be necessary to apply some scaling or other affine transformation in order to obtain good alignment between the key signal and the image projected by the projector. The key signal can then be used to mask out the actor, for example by placing the mask image in the OpenGL Stencil buffer as in the method described above. This method has the advantage that it is not necessary to compute a 3D model of the actor, since the outline of the actor from the point-of-view of the projector is captured directly. However, this approach requires a camera to be positioned close to each projector. A mixture of these approaches is also possible, in which projectors which have auxiliary cameras close to them have their mask signals derived directly from these cameras, and other projectors have mask signals derived from a rough 3D model generated from the auxiliary camera images.

Whatever the method used to generate the actor mask, it is desirable if the mask signal is made to appear slightly larger than the actor, to account for the distance that the actor might move in the time required to generate and render the mask signal, and to compensate for any inaccuracies in the position of the generated mask from other causes such as calibration errors. It may also be desirable to estimate the speed of movement of the actor and move the mask further along the motion trajectory to the predicted position of the actor at the time that the mask will be projected. These methods could also be combined, by enlarging the actor mask only in the direction of the actor's movement. This processing could be implemented in the same processing unit 25 that generated the actor model.

The actor mask will of course obscure some elements of the projected scene, which could potentially contain scene elements that the actor needs to see. To reduce this potential problem, more than one projector can be used to project onto each surface, projecting from different positions. The projectors may be specifically placed based on the scene layout to ensure adequate coverage in important areas, for example based on consideration of masked areas, or may be generically placed in a studio. The masked-out portion of one image will generally not coincide with the masked-out area in another, except for regions where the actor is very close to the screen. This approach will result in most areas of the screen being of double the brightness. If this is considered to be a problem in a particular embodiment, then mask signals can be derived using the above-mentioned geometric techniques to ensure that a maximum of one (or other desired number) projector illuminates any given part of the screen.

Where more than one projector is used, particularly where the camera moves significantly or where there are multiple cameras, projectors may be selectively used so that projectors that are nearly coincident with (for example within the tolerance of the scatter angle of the background cloth) the direction of view of an active camera are suppressed.

Although this embodiment of the invention has been described in the context of using a retro-reflective blue screen, it can also be applied with any other kind of screen and projection system that provides sufficient contrast for the actors to see a projected image whilst still allowing chromakeying to be performed.

One example of another such projection system is one that uses bright projectors and a conventional blue screen, where the projectors have a short display period, which is timed to occur during a period when the camera shutters are not open. For instance, TV cameras with a 50 Hz field rate can be shuttered to $1/100^{th}$ of a second exposure time, and the projectors can be arranged only to project light for the $1/100^{th}$ second when the camera shutters are closed. Different proportions can be used, for example depending on ambient lighting. For example, in dimly lit scenes, the camera may require a longer shutter period, leaving a shorter period for the projector to project each frame, but since the ambient lighting level is lower, this may suffice for the projected image to remain visible. If the projectors have an inherent response time that is too slow to generate such an output, they can be shuttered using a mechanical shutter (or electronic shutter additional to the projector). With this arrangement, there may be no need to generate mask signals to prevent projected light from falling on the actors.

A system incorporating this invention may also include one or more projectors that project images onto non-chromakey surfaces, such as the studio wall behind the camera. This allows the actor to see the virtual environment when looking in directions other than towards the cyclorama. The rendering of such images needs to take account of the actor's head position and the position of the surface being used as a projection screen, as for the other projectors. However, it is normally not found to be necessary to generate masking signals to prevent the projected image from falling on the actor, as it will generally be possible to site such projectors so that the actor does not obstruct the light path.

Although the invention has been described in the case of a single actor, implementations are possible that extend the principle to work with two or more actors.

At simplest, where there are two or more actors on the set but only one actor needs to interact closely with virtual objects, the actor head tracking system can be modified to track only the head of this actor. This could be implemented, for example, by using a human operator to identify the actor for whom the projected images should be optimised. The tracking system could be switched between actors during the scene as required, according to which actor is carrying out the most important interactions with virtual objects. More sophisticated implementations, for example that incorporate a facial recognition system into the actor head tracker, are also possible.

An alternative method is to render the scene separately for each actor viewpoint, and project the scenes in different colours. Each actor can then be told to look at, for example, the 'red scene' or the 'green scene'. Some assistance could be provided to the actors by the use of coloured contact lenses 32 to filter out the scene being projected for the other actors.

The invention has been described in the context of a conventional virtual studio system, where the final image seen by the viewers is derived directly from the studio camera image, using a keyer to mix real and virtual elements. However, it can be also be applied to other virtual studio systems. For example, the images from the auxiliary cameras can be used to create a high-quality 3D model of the actors which is incorporated in the 3D model of the scene, and the complete scene may then be rendered to produce the final output. In this situation, there is no need for the studio camera 2, 20, the broadcast-standard renderer 26 and the chroma-keyer 27.

The invention can be applied for any purpose where it is necessary to present a view of a virtual scene on a screen to a person whilst simultaneously being able to use a keying system such as a chroma key system to separate that person from the screen. One such application is immersive telepresence. Telepresence systems currently exist in which the participant views one or more screens in front of them, and is seen by one or more cameras viewing them from the front. References to (virtual) studios in this application are intended to encompass any environment arranged so that images can be taken by a camera, and thus are intended to include applications such as telepresence or teleconferencing as well as film or broadcast studios. If such systems intend to portray the participant as sitting in a virtual space, then a coloured background screen will usually be placed behind them so that the participant may be separated from the background by chroma keying. Alternatively, the background scene may be assumed to be static, and the participant can then be separated from the background by the use of a keying process such as image differencing. In such a case it may not be possible to place a screen behind the person showing an image of the virtual world rendered correctly for their viewpoint, since this makes either of these segmentation methods ineffective, and makes head tracking difficult. Equally, it may not be practical to place a camera behind or to the side of the person and obtain a segmented image of the person from that viewpoint, if a projection screen would be visible in the background. However, by using the combination of projection, keying and head tracking methods of the present invention, immersive telepresence or the like may be simplified.

The foregoing description of an embodiment is by way of non-limiting example only and it will be apparent, and it is explicitly stated, that modifications of detail may be made. Features and sub-features may be provided independently of other features and in other combinations unless otherwise stated.

What is claimed is:

1. A method of providing a visual representation of a scene to a participant in a studio, the studio being arranged to be viewed by a camera in a camera view direction to obtain a camera image and having at least a portion of a background object arranged to be keyed out of the camera image by a keying process, the method comprising:
    obtaining an estimate of the viewpoint of the participant;
    rendering an image of the scene corresponding to the viewpoint of the participant;
    projecting at least a portion of the rendered image from at least one direction different from the direction of view of the camera to provide a projected image portion visible to the participant on the background object; and
    keying the projected image portion out of the camera image obtained by the camera by the keying process.

2. The method according to claim 1, wherein the keying process is a chroma-keying process and the rendered image is projected so that the colour of the background object as seen by the camera is substantially a background colour.

3. The method according to claim 1, wherein the background object retro-reflects a portion of light with a first, relatively high, reflectivity and diffusely reflects light with a second, relatively low, reflectivity.

4. The method according to claim 3, wherein the background object is lit with key light from a direction substantially coincident with the camera direction so that key light is retro-reflected to the camera with a first, relatively high, intensity and the projected image is projected from a different direction.

5. The method according to claim 4, wherein the key light comprises light selected from the group consisting of a light selected key colour or light having a selected temporal variation.

6. The method according to claim 3, wherein the first reflectivity is at least double the second reflectivity, preferably at least ten times the first reflectivity.

7. The method according to claim 1, further comprising masking a portion of the projected image based on the position of the participant to reduce projection onto the participant.

8. The method according to claim 7, wherein the masked portion is based on a stored or estimated outline of the participant.

9. The method according to claim 1, further comprising masking a portion of the projected image based on the position of an object to reduce projection onto the object.

10. The method according to claim 1, wherein the background retro-reflects a portion of light and wherein the background is at least partially translucent and wherein the background is lit with key light from a direction substantially coincident with the camera direction so that key light is retro-reflected to the camera with a first, relatively high, intensity and the projected image is projected onto the rear of the background.

11. A method according to claim 10, wherein the projected image is at least partially masked or attenuated based on the position of a camera viewing the background to reduce the intensity of light from the projected image reaching the camera.

12. The method according to claim 1, wherein the projection intensity, the key light intensity and the background properties are selected so that the intensity of the key light received at the camera is at least double the intensity of light received from the projected image.

13. The method according to claim 1, wherein the intensity of the projected image is selected so as to be visible by the participant but wherein the scattered light from the projected image does not disrupt the keying process.

14. The method according to claim 1, wherein the image is projected during a period when the camera shutter is closed.

15. The method according to claim 1, wherein the keying process is based on temporal modulation of the background illumination and the projected image is temporally modulated.

16. The method according to claim 1, wherein the participant's viewpoint is estimated based on the measure of position of the participant, wherein the measure of position comprises an estimate of position of a body portion of a participant and wherein the viewpoint is estimated based on a physical relationship of the body portion to the eyes of the participant.

17. The method according to claim 1, wherein the position of the head of the participant is estimated and wherein an estimate of the position of the head of the participant is used as an estimate of the viewpoint of the participant.

18. The method according to claim 1, wherein the image is projected from a plurality of sources, wherein images from at least two sources at least partially overlap and wherein the intensity of at least one image is modulated or a portion of at least one image is masked to reduce intensity variation in a region of overlap.

19. The method according to claim 1, further comprising recording a sequence of images of the participant with said camera and processing said sequence of images to remove or replace the background by the keying process, wherein the projected image is substantially removed.

20. The method according to claim 1, further comprising projecting at least two images to be separately viewable by two participants wherein the images are projected onto separate background object portions.

21. The method according to claim 20, wherein the images at least partially overlap and wherein the images are multiplexed and the participants are provided with a demultiplexing device so that each participant views preferentially a single image.

22. A computer-readable medium comprising instructions for performing in a method of providing a visual representation of a scene to a participant in a studio, the studio being arranged to be viewed by a camera in a camera view direction to obtain a camera image, the method including deriving an estimate of the viewpoint of the participant; rendering an image of the scene corresponding to the viewpoint of the participant; projecting the image of the scene from at least one direction different from the direction of view of the camera to provide a projected image portion visible to the participant in a background; and keying the projected image portion on the background out of the camera image with a keying process.

* * * * *

UNITED STATES PATENT AND TRADEMARK OFFICE
CERTIFICATE OF CORRECTION

PATENT NO. : 7,468,778 B2  Page 1 of 1
APPLICATION NO. : 10/941068
DATED : December 23, 2008
INVENTOR(S) : Graham A. Thomas It is certified that error appears in the above-identified patent and that said Letters Patent is hereby corrected as shown below:

On the cover page:

Add Assignee as follows:

(73) Assignee:  BRITISH BROADCASTING CORPORATION,

LONDON (UK)

Signed and Sealed this

Twenty-seventh Day of April, 2010

David J. Kappos
*Director of the United States Patent and Trademark Office*